(12) United States Patent
Davis et al.

(10) Patent No.: US 11,700,944 B2
(45) Date of Patent: Jul. 18, 2023

(54) SUPPORT APPARATUS

(71) Applicant: BANYAN LICENSING L.L.C., Vero Beach, FL (US)

(72) Inventors: Edmund Scott Davis, Vero Beach, FL (US); Scott Allen Sattizahn, Charlotte, NC (US); Timothy James Rohm, Gastonia, NC (US)

(73) Assignee: BANYAN LICENSING L.L.C., Vero Beach, FL (US)

( * ) Notice: Subject to any disclaimer, the term of this patent is extended or adjusted under 35 U.S.C. 154(b) by 0 days.

(21) Appl. No.: 17/286,331

(22) PCT Filed: Oct. 16, 2019

(86) PCT No.: PCT/US2019/056540
§ 371 (c)(1),
(2) Date: Apr. 16, 2021

(87) PCT Pub. No.: WO2020/081685
PCT Pub. Date: Apr. 23, 2020

(65) Prior Publication Data
US 2021/0378404 A1      Dec. 9, 2021

Related U.S. Application Data

(60) Provisional application No. 62/746,449, filed on Oct. 16, 2018.

(51) Int. Cl.
*A47C 7/46*     (2006.01)
*B60N 2/66*     (2006.01)
(Continued)

(52) U.S. Cl.
CPC .............. *A47C 7/029* (2018.08); *A47C 7/021* (2013.01); *A47C 7/024* (2013.01); *A47C 7/46* (2013.01);
(Continued)

(58) Field of Classification Search
CPC ......... B60N 2/663; A47C 7/021; A47C 7/024; A47C 7/029; A47C 7/46
(Continued)

(56) References Cited

U.S. PATENT DOCUMENTS 2,482,996 A  *  9/1949  Wisby .................... A47C 7/029
                                                    297/452.25 X
2,663,359 A  *  12/1953  Wood ................... B60N 2/3097
                                                    297/452.53
(Continued)

FOREIGN PATENT DOCUMENTS

DE         10117602 C1  * 10/2002  .............. A47C 3/00
JP         09056523 A   *  3/1997  ............. A47C 7/024
(Continued)

OTHER PUBLICATIONS

International Search Report issued for International Application No. PCT/US2019/056540, dated Jan. 10, 2020.
(Continued)

*Primary Examiner* — Rodney B White
(74) *Attorney, Agent, or Firm* — Moore & Van Allen, PLLC; Henry B. Ward, III

(57) ABSTRACT

The present invention relates to support apparatus for supporting at least a portion of a gluteal region of a user while the user is seated in a seating apparatus comprising a seating surface, a back support surface and a transition region at the intersection of the seating surface and the back support surface. The support apparatus a support member structured to support at least a portion of the gluteal region of the user. The support apparatus further comprises a support element structured to position the support member at the transition region of seating apparatus such that the support member extends between the seating surface and the back support surface of the seating apparatus.

18 Claims, 9 Drawing Sheets

(51) Int. Cl.
  *A47C 7/02*  (2006.01)
  *B60N 2/64*  (2006.01)
  *B60N 2/70*  (2006.01)

(52) U.S. Cl.
  CPC .............. *B60N 2/646* (2013.01); *B60N 2/663* (2015.04); *B60N 2/7005* (2013.01)

(58) Field of Classification Search
  USPC ........................................................ 297/284.5
  See application file for complete search history.

(56) References Cited

U.S. PATENT DOCUMENTS

| | | | | |
|---|---|---|---|---|
| 2,833,341 | A * | 5/1958 | Bornstein | B60N 2/7005 297/229 |
| 3,376,070 | A * | 4/1968 | Johnson | A47C 7/029 297/452.25 X |
| 3,503,649 | A * | 3/1970 | Johnson | A47C 7/029 297/452.25 X |
| 3,749,442 | A * | 7/1973 | Berg | A47C 7/14 297/452.25 X |
| 4,047,757 | A * | 9/1977 | Eames | A47C 7/0213 297/230.12 |
| 4,550,458 | A * | 11/1985 | Fiore | A47G 9/109 5/640 |
| 5,114,209 | A | 5/1992 | Dunn | |
| 5,137,333 | A * | 8/1992 | Chee | A47C 3/16 297/452.21 X |
| 5,313,678 | A * | 5/1994 | Redewill | A47C 21/003 5/639 |
| 5,533,787 | A * | 7/1996 | Xiang | B60N 2/66 297/284.5 X |
| 5,577,811 | A * | 11/1996 | Ogg | A47C 3/12 297/284.4 |
| 5,887,951 | A * | 3/1999 | Willingham | A47C 7/029 297/452.23 X |
| 5,906,413 | A * | 5/1999 | Yang | B60N 2/7005 297/284.5 X |
| 5,974,607 | A * | 11/1999 | Smith | A47C 7/383 5/636 |
| 6,241,320 | B1 | 6/2001 | Chew et al. | |
| 6,532,962 | B1 * | 3/2003 | Walker | A47C 7/425 128/845 |
| 6,957,462 | B1 * | 10/2005 | Wilcox | A47C 7/383 5/636 |
| 6,959,964 | B1 * | 11/2005 | Zapf | A47C 7/425 297/230.12 |
| 7,140,057 | B2 | 11/2006 | Hetzel et al. | |
| 7,607,738 | B2 * | 10/2009 | Gregory | A47C 7/029 297/452.23 |
| 7,614,691 | B1 * | 11/2009 | Schmitz | A47C 7/021 297/219.1 X |
| 8,336,963 | B1 * | 12/2012 | DeMonaco | A47C 17/04 297/411.27 |
| 8,566,987 | B1 | 10/2013 | Burge | |
| 8,672,401 | B2 * | 3/2014 | Schreiber | B60N 2/24 297/219.1 X |
| 8,695,135 | B2 | 4/2014 | Berube | |
| 9,033,416 | B1 * | 5/2015 | Vanderhorst | A47C 7/46 297/284.5 X |
| 2005/0022306 | A1 * | 2/2005 | Hetzel | A61G 5/1045 5/654 |
| 2005/0137506 | A1 * | 6/2005 | Chow | B60N 2/663 601/149 |
| 2006/0175889 | A1 * | 8/2006 | Fridd | B60N 2/666 606/241 |
| 2010/0187888 | A1 | 7/2010 | Gallegos | |
| 2013/0198961 | A1 * | 8/2013 | Davis | A47C 16/00 5/648 |
| 2014/0028067 | A1 * | 1/2014 | Wan | A47C 7/142 297/312 |
| 2014/0132051 | A1 * | 5/2014 | Freedman | A47C 9/025 297/312 |
| 2015/0108802 | A1 * | 4/2015 | Krishtul | A47C 7/021 297/283.1 |
| 2015/0173515 | A1 * | 6/2015 | Freedman | B62J 1/005 297/313 |
| 2016/0120319 | A1 | 5/2016 | Davis et al. | |
| 2017/0000263 | A1 * | 1/2017 | Krishtul | A47C 7/029 |
| 2017/0119161 | A1 | 5/2017 | Olm | |
| 2021/0022512 | A1 * | 1/2021 | Vertuca, III | A47C 3/029 |

FOREIGN PATENT DOCUMENTS

| | | | | |
|---|---|---|---|---|
| JP | 4769327 | B1 * | 9/2011 | ............ A47C 7/021 |
| KR | 20110016425 | A * | 2/2011 | ............ A47C 7/029 |
| KR | 1750887 | B1 * | 6/2017 | ............ A47C 3/029 |

OTHER PUBLICATIONS

Written Opinion issued for International Application No. PCT/US2019/056540, dated Jan. 10, 2020.

International Preliminary Report on Patentability issued for International Patent Application No. PCT/US2019/056540, dated Apr. 14, 2021.

Extended European Search Report issued by the European Patent Office for European Patent Application No. 19872347, dated Jun. 2, 2022.

* cited by examiner

SUPPORT APPARATUS

CROSS REFERENCE TO RELATED APPLICATION

This application claims the benefit of U.S. Provisional Patent Application Ser. No. 62/746,449 entitled "Support Apparatus," filed on Oct. 16, 2018, the entirety of which is incorporated herein by reference.

FIELD OF THE INVENTION

The present invention relates to support devices and, more specifically, a support apparatus that is structured to support a user's ischial tuberosity, gluteal region and/or the user's coccyx.

BACKGROUND

A support is generally useful for the purpose of rendering comfort or support to a user. Conventional supports such as pillows are manufactured using "support-filler material" such as high resilient ("HR") urethane foam and are typically structured to support the head of a user. However, these supports are unable to provide optimal support to the mid-region of the user's body, and more specifically, the region where the trunk/torso meets the pelvis/lower limbs, such as the user's ischial tuberosity and gluteus, especially when the user is in a seated position. Conventional supports may not only fail to support the mid-region of the user's body when seated, but they may exacerbate injured or sensitive areas in this region by causing undue pressure, strain and discomfort along the mid-region and lower limbs of the user's body when employed to support the mid-region when the user is seated. Thus, there is a need for a support apparatus that is structured to support a user's mid-region and, more specifically, the region where the trunk/torso meets the pelvis/lower limbs, such as the user's ischial tuberosity, gluteus and coccyx, especially when the user is in a seated position, without materially displacing the user from the seat.

BRIEF DESCRIPTION OF THE DRAWINGS

The support apparatus of the present invention alleviates the forgoing deficiencies of conventional supports and also provides additional advantages. The advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

Figure 1:
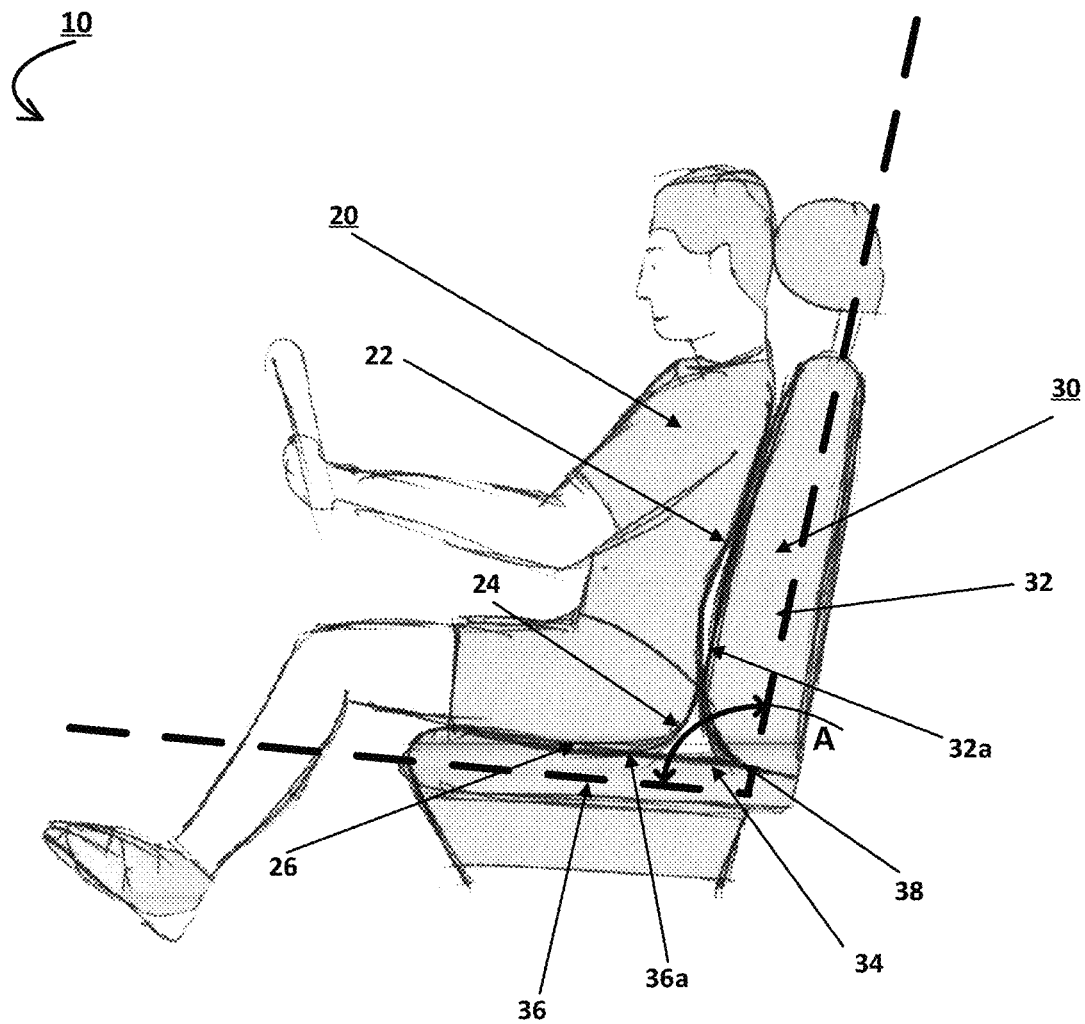
FIG. 1 illustrates a lateral view 10 of one instance of a user in a seated position in a seating apparatus.

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A "seated" or "sitting" position as used herein refers to a resting position of the user. In some instances, in the seated/sitting position, the user's body weight is primarily/substantially supported by the mid-region of the user's body, and particularly, by the user's ischial tuberosity and/or gluteal muscles/buttocks in contact with a surface of the seating apparatus, while the user's torso and the user's thighs are positioned at an angle with respect to each other (e.g., about 90°, 85°, 100°, 110°, 70°, 65°, etc.). In some instances, in the seated/sitting position, the user's gluteal muscles/buttocks in contact with a horizontal/substantially horizontal surface of the seating apparatus (and/or from the rearmost part of the buttocks to the back of the lower leg), while the user's torso is upright and maybe in contact with a vertical/substantially vertical surface of the seating apparatus.

A "seating apparatus" as used herein may refer to a chair, an automobile/airline seat, an armchair, a bench, a stool, a wheelchair, a floor/ground surface, a chaise lounge, a couch, and/or the like, that are configured for accommodating a user, particularly in a seated/sitting position. Typically, the seating apparatus comprises a seating portion (e.g., a substantially horizontal surface) for supporting the user's weight via contact with the user's buttocks (and/or from the rearmost part of the buttocks to the back of the lower leg). Moreover, the seating apparatus may also comprise a back support (e.g., an upright or a substantially vertical surface) for supporting the back of the user (i.e., posterior of the lumbar region, the torso and/or the head and neck of the user), such as a backrest. Alternatively, the seating apparatus may be configured such that the seating portion is configured to be positioned adjacent to/against an external back support (e.g., an upright or a substantially vertical surface) to form an angle therebetween for supporting the back of the user (e.g., a seating portion/substantially horizontal surface of the seating apparatus placed against a wall forming a non-zero angle therebetween, or a floor and a wall forming a corner therebetween).

Conventional seating apparatuses and conventional cushions are unable to provide optimal support to the mid-region of the user's body, and more specifically, the region where the trunk/torso meets the pelvis/lower limbs, such as the user's ischial tuberosity, gluteus, especially when the user is in a seated position. With respect to conventional seating apparatuses, such as conventional automotive and office seats, the apparatuses have a roughly vertical back support member for the users back and a roughly horizontal seating portion for supporting the user's legs and buttocks. While these may be reclined or declined slightly, they usually join at a roughly 90-degree angle. There is a "void" or "gap" or unsupported space between them, i.e., in the vertex/corner or transition region between the seating portion and the back support portion. When sitting in these chairs, user's lack support for their ischial tuberosity, gluteus maximus and/or coccyx in this gap, as described later on with respect to FIG. 1. The resulting lack of support can result in degradation of user's posture, slippage of the gluteus into the void/gap and migration of the user out of the intended position for intended support of the design of the seating surfaces.

Moreover, conventional cushions fail to remediate these deficiencies of conventional seating apparatuses. Conventional cushions are typically cuboidal and planate in shape which not only (i) have no means for optimally supporting the mid-region of the user's body and particularly, the ischial tuberosity, gluteus maximus and coccyx, but their very shape and structure even (ii) restrict/impede placement of the cushions into the void/gap in the first place. Conventional cushions are at best duplicative of the seating portion or the back support of conventional seating apparatuses and fail to provide adequate support in the unsupported space between them. Also, the shape and thickness of conventional cushions undesirably materially displace the user from the existing seating surface, e.g., when positioned over the seating surface, or undesirably materially displace the user from the existing back support, e.g., when positioned over the back support of the seating apparatus, thereby blocking the contact of the user's body with one or both of the seating surface and the back support. This material displacement of the user with respect to the seating apparatus, may cause pressure points and discomfort in back, spine, the mid-region and upper thighs of the user, in particular. In addition, in the case where the seating apparatus is an automobile seat (car seat illustrated in FIG. 1), the thickness of conventional cushions make it difficult to enter/exit a vehicle, restricts steering wheel leg clearance and head room, interferes with safety restraints, create discomfort due to being out of the intended seating position in the chair and other problems.

The support apparatus of the present invention alleviates the foregoing deficiencies of conventional seats and cushions, and also provides other advantages. In particular, embodiments of the present invention provide a support apparatus that can be assembled with a seating apparatus (e.g., removably assembled) and that is configured to provide support in the transition region between the seating portion and the back support portion of the seating apparatus, thereby supporting the user's ischial tuberosity, gluteal region and/or relieving pressure at and supporting the region at and around the user's coccyx, particularly, when the user is in a seated positon, without materially displacing the user (i.e., while still allowing the user's contact with the seating surface and the back support), as will be described in detail with respect to FIGS. 2-5B. In some embodiments, the support apparatus of the present invention comprises a cushioning member (e.g., a pillow member or another flexible member), as a whole or in part. In some embodiments, the support apparatus of the present invention is rigid, at least in part. In some embodiments, the support apparatus of the present invention comprises a rigid or substantially frame/body, or an alt least partially flexible frame/body.

FIG. 1 illustrates a lateral view 10 of one instance of a user in a seated position in a seating apparatus. Specifically, FIG. 1 illustrates a user 20 seated in a seating apparatus 30. The seating apparatus 30 comprises a seating portion 36 having a seating surface 36a, which is configured to support the thigh portion 26 of the user 20. The seating apparatus 30 further comprises a back support portion 32 having a back support surface 32a, which is configured to support the back or posterior torso portion 22 of the user 20. The seating surface 36a and the back support surface 32a typically meet at the vertex/corner or intersection portion 38 to form a non-zero angle "A" therebetween. In some instances, the angle "A" may be a substantially right angle, i.e., the seating surface 36a and the back support surface 32a may be substantially orthogonal. In some instances, the angle "A" may be an acute angle or an obtuse angle. As such the angle A may be about 90°, 75°, 85°, 100°, 105°, 110°, 115°, 70°, 65°, 85°-95°, 45°-95°, 45°-95°, 35°-95°, 75°-115°, 85°-120°, 85°-120°, 35°-120°, and/or in between, surrounding or overlapping these values/ranges. The seating surface 36a and the back support surface 32a meet at the intersection portion 38, forming a void 34 or unsupported space 34 between them, i.e., in the vertex/corner or transition region between the seating surface 36a and the back support surface 32a. However, as illustrated, the void 34 fails to support the mid-region 24 of the user's body and particularly, the ischial tuberosity, gluteus maximus and coccyx in the mid-region 24 of the user.

The support apparatus 100 of the embodiments of the present invention, as will be described in detail below with respect to FIGS. 2-5B, overcomes the foregoing disadvantages of conventional seating apparatus and cushions and not only (i) optimally supports and stabilizes the mid-region 24 of the user's body comprising the user's ischial tuberosity, gluteal region and/or the user's coccyx, but also (ii) provides support in the transition region between the seating portion and the back support portion of the seating apparatus when assembled in the seating apparatus (e.g., removably assembled), (iii) without materially displacing the user (i.e., while still allowing the user's contact with the seating surface and the back support) and (iv) without impeding user movements and comfort. In addition, the support apparatus 100 of the embodiments of the present invention (v) provides an optimal/predetermined pelvis tilt or pivot of the hips of the user, (vi) positions the user's spine in an optimal alignment (e.g., a better/suitable/comfortable alignment in comparison with the alignment of the user's spine in the absence of the present invention), and (vii) provides optimal lumbar support even when the seating apparatus (particularly the seating portion of the seating apparatus) both: (a) permanently sags/deforms/deteriorates with continued use and (b) temporarily deforms when the user is seated therein, which would not be possible in the absence of the present invention, or with the seating apparatus alone. The foregoing provision of proper posture (i.e., combination of optimal/ predetermined pelvis tilt or pivot of the hips, optimal alignment of the spine and optimal lumbar support) by the present invention to the user, when seated, prevents undue pressure of internal organs of the user. In particular, the feature of providing proper posture even when the seating apparatus, and particularly the seating portion of the seating apparatus, permanently sags/deforms/deteriorates with continued use, precludes the need to replace the seating apparatus (which may be cumbersome and expensive, if at all possible, especially in the instances where the seating apparatus is an automobile seat) and allows continued use of the aged/permanently deformed seating apparatus without endangering the health and comfort of the user.

In particular, embodiments of the present invention provide a support apparatus that can be assembled with a seating apparatus (e.g., removably assembled) and that is configured to provide support in the transition region between the seating portion and the back support portion of the seating apparatus, thereby supporting the user's ischial tuberosity, gluteal region and/or the user's coccyx, particularly, when the user is in a seated positon, without materially displacing the user (i.e., while still allowing the user's contact with the seating surface and the back support). The functions and features of various embodiments of the support apparatus are described below. It should be appreciated that these features can be provided separately in support apparatus or the support apparatus may have combinations of individual features or may have all of the features.

Figure 2:
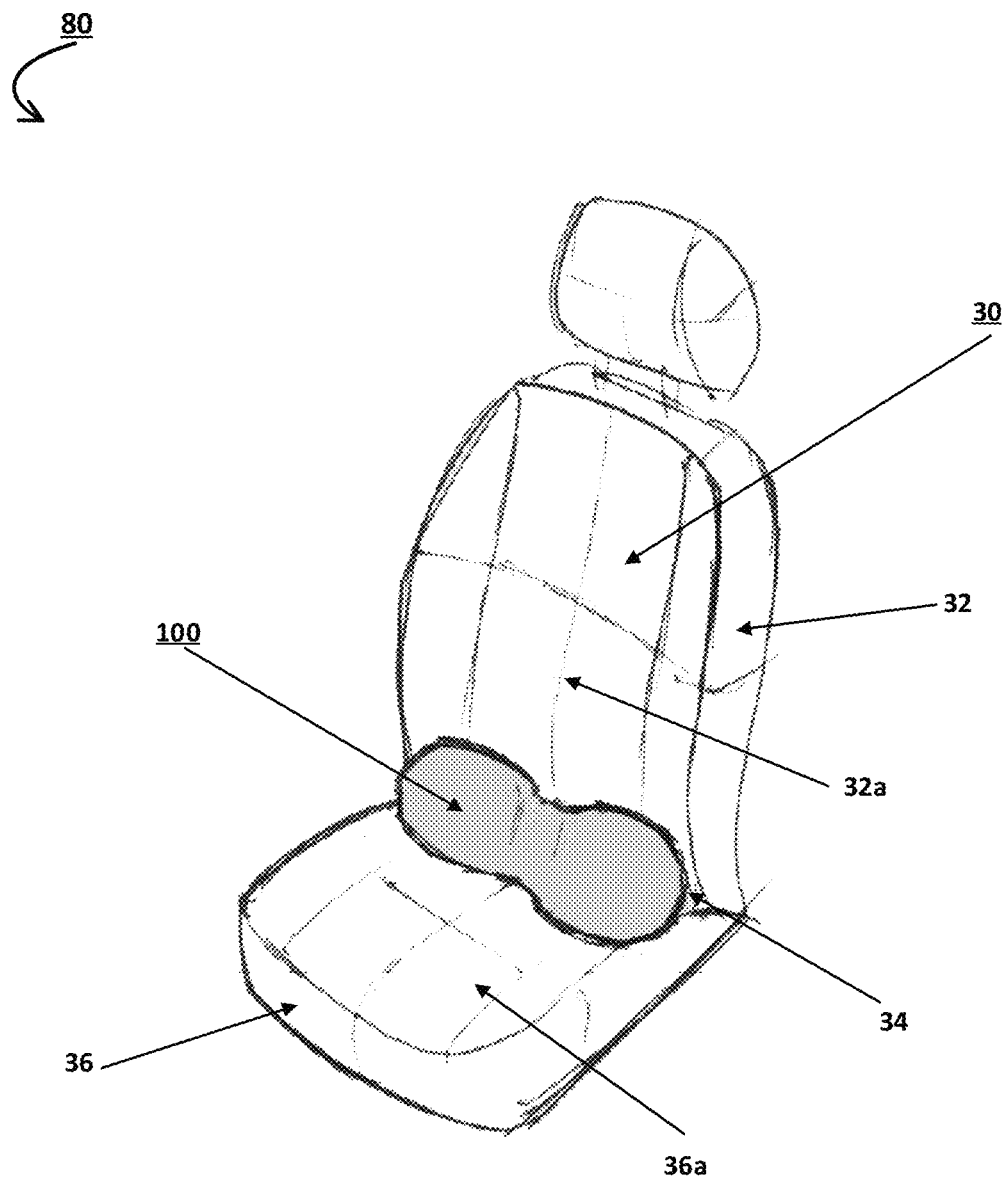
FIG. 2 illustrates a perspective view 80 of support apparatus 100 assembled with a seating apparatus, in accordance with some embodiments of the invention.

FIG. 2 illustrates a perspective view 80 of support apparatus 100 assembled with a seating apparatus 30, in accordance with some embodiments of the invention. Specifically, as illustrated, the support apparatus 100 is structured to be positioned in the void 34 or unsupported space 34 at transition region between the seating surface 36a and the back support surface 32a of the seating apparatus 30. In some embodiments, at least a portion of the support apparatus 100 contacts the seating surface 36a of the seating portion 36 and/or at least a portion of the support apparatus 100 contacts the back support surface 32a of the back support portion 32, when assembled with or placed on the seating apparatus 30. In some embodiments, the support apparatus 100 is removably assembled with the seating apparatus 30, i.e., the support apparatus 100 may be easily disassembled from the seating apparatus 30 without permanently modifying either the support apparatus 100 or the seating apparatus 30. Here, the support apparatus 100 is configured such that the weight of the user, when seated in the seating apparatus 30, stabilizes and holds the support apparatus 100 in position, without displacement. However, in other embodiments, the support apparatus 100 may be permanently assembled with the seating apparatus 30.

Figure 3A:
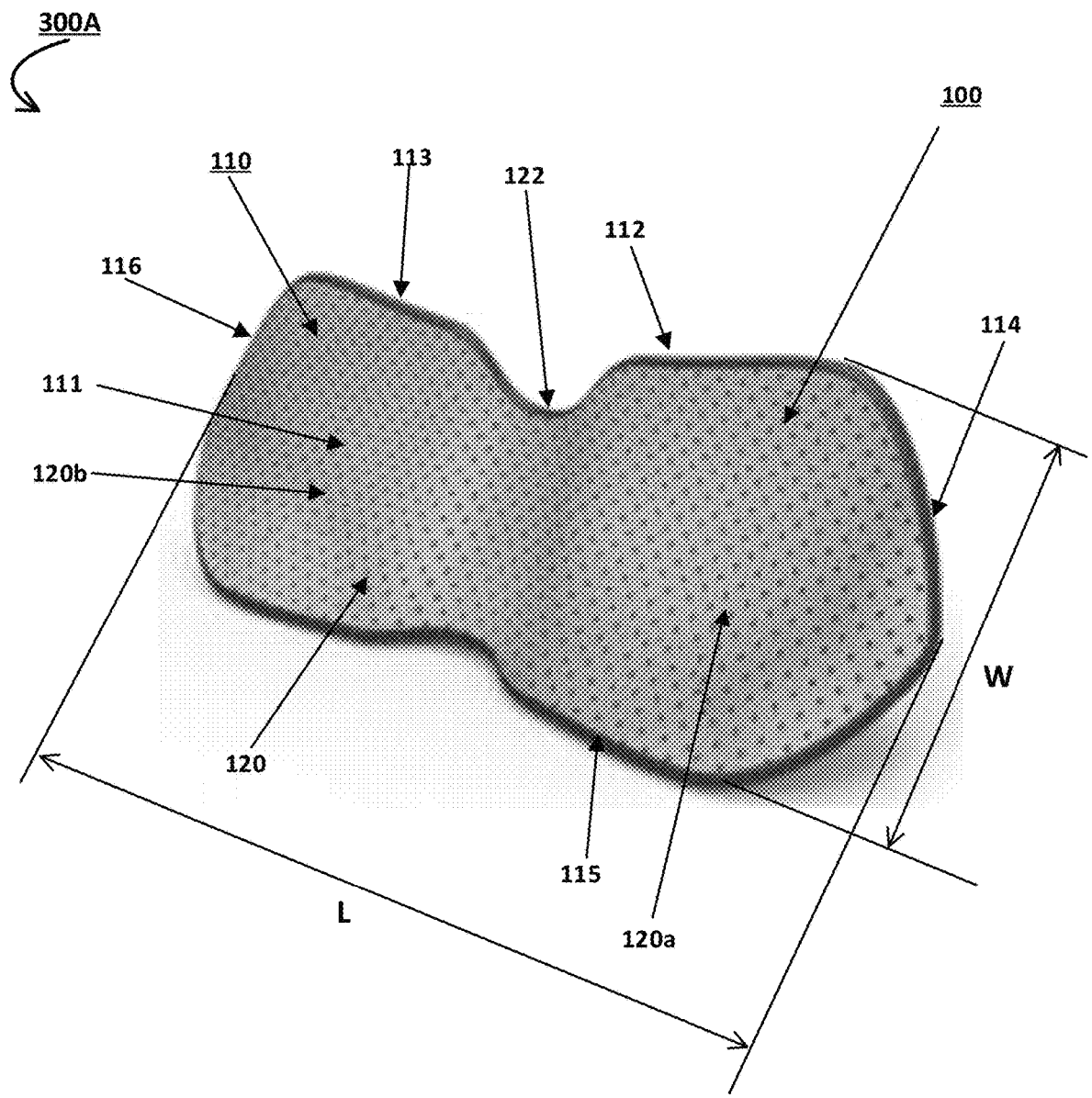
FIG. 3A illustrates a front perspective view 300A of a support apparatus 100, in accordance with some embodiments of the invention.
Figure 3B:
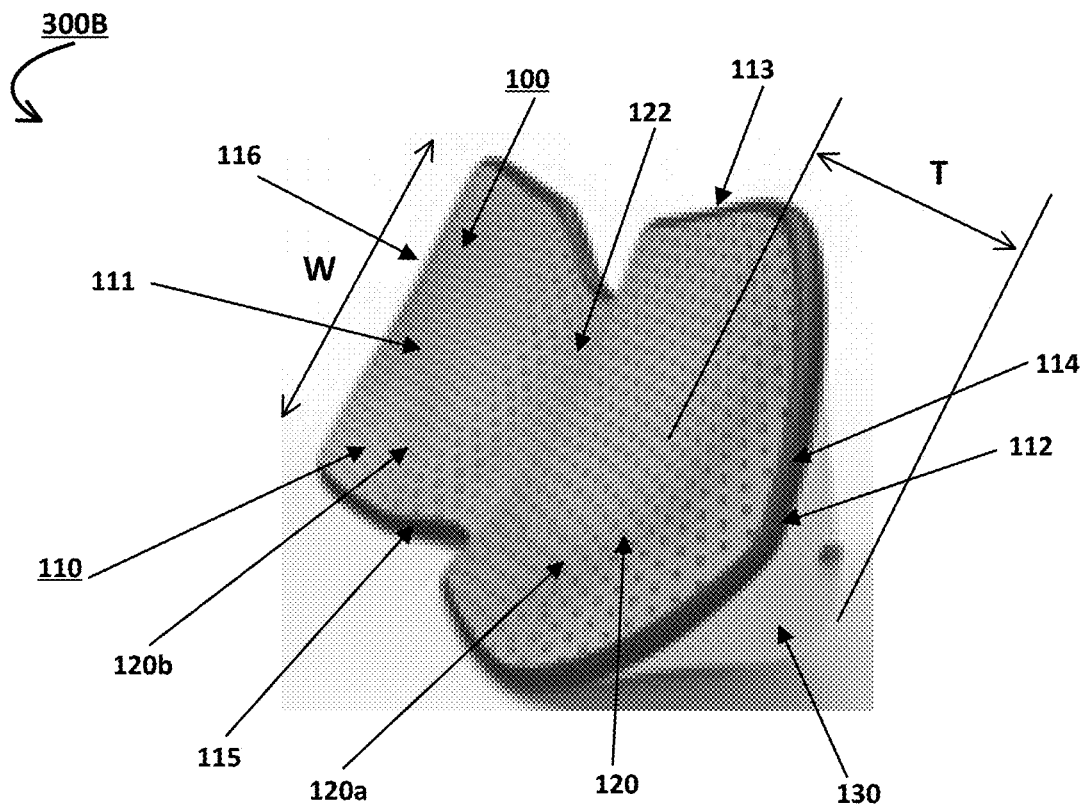
FIG. 3B illustrates a lateral perspective view 300B of the support apparatus 100, in accordance with the embodiment of FIG. 3A.
Figure 3C:
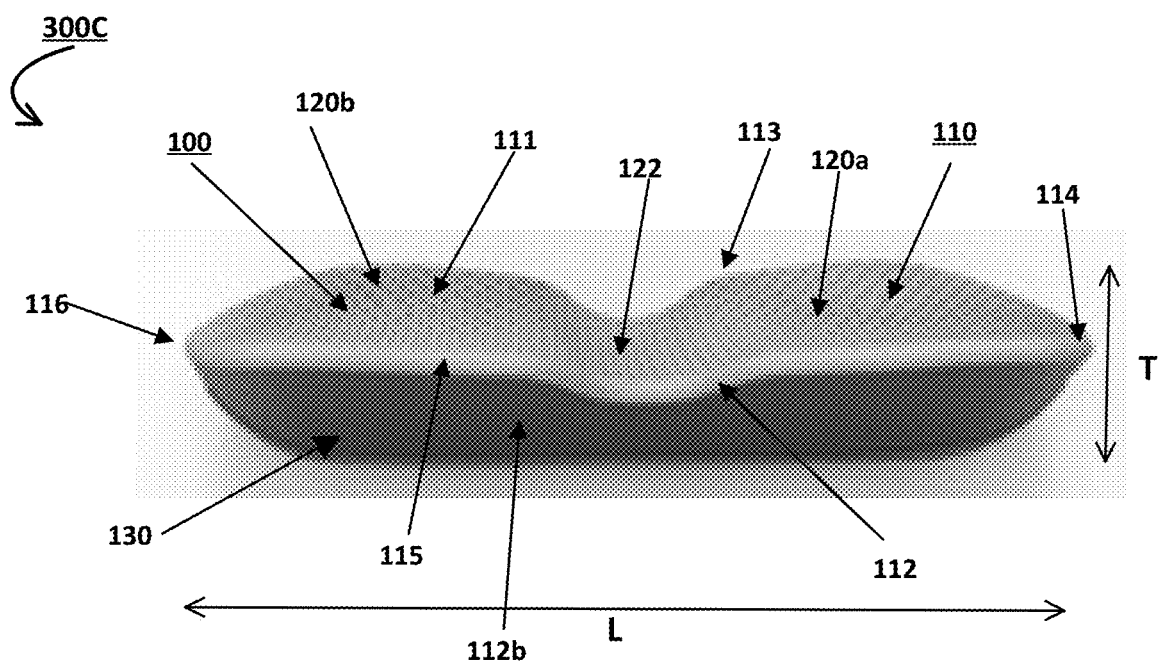
FIG. 3C illustrates a side view 300C of the support apparatus 100, in accordance with the embodiment of FIG. 3A.

FIGS. 3A-3C illustrate a support apparatus 100, in accordance with some embodiments of the invention. The support apparatus 100 includes a support body 110, as illustrated by FIGS. 3A-3C. In some embodiments, the support apparatus 100 also comprises an outer cover (not illustrated) configured to at least partially enclose the support body 110. The outer cover is preferably made of a material that is soft to the skin of the user, e.g., silk, satin or cotton, and is preferably removable so that the outer cover may be washed and then refitted on the support apparatus. In some embodiments, the support body 110 comprises one or more types of filler material, which may be enclosed by a barrier or sheath (not illustrated) in some instances. In some embodiments, the support body 110 comprises one or more vents, or through apertures for allowing air circulation and cooling of the support apparatus 100. The configuration of these components is described below in detail. The support apparatus 100 can comprise more or fewer components as required for various embodiments.

FIG. 3A illustrates a front perspective view 300A of a support apparatus 100, in accordance with some embodiments of the invention. Although, termed as "front" it is understood that "front side" herein means the support apparatus 100 being viewed from the side 111 and not any particular orientation of the support apparatus 100 during use or otherwise. FIG. 3B illustrates a lateral perspective view 300B (right-side view, i.e., when viewed from side 114) of the support apparatus 100, in accordance with the embodiment of FIG. 3A. FIG. 3C illustrates a side view 300C (bottom side view, i.e., when viewed from side 115) of the support apparatus 100, in accordance with the embodiment of FIG. 3A.

Referring to FIGS. 3A-3C, the support body 110 of the support apparatus 100 comprises a support member 120 (also referred to as a "first body portion 120") configured for receiving, supporting and/or accommodating the user's gluteal muscles, panniculus adiposus or buttocks of the user. The support member 120 may comprise a first support portion 120a configured to support the corresponding/adjacent portion of the user's gluteal muscles when the user is seated against/on the support apparatus 100, i.e., the first support portion 120a configured to support at least a portion of the left gluteus maximus muscle, left gluteus medius muscle and/or left gluteus minimus muscle when the user is seated against the support apparatus 100 with the user's posterior facing and adjacent of the side 111 of the support apparatus 100. The support member 120 may further comprise a second support portion 120b configured to support the corresponding/adjacent portion of the user's gluteal muscles when the user is seated against the support apparatus 100, i.e., the second support portion 120b configured to support at least a portion of the right gluteus maximus muscle, right gluteus medius muscle and/or right gluteus minimus muscle when the user is seated against the support apparatus 100 with the user's posterior facing and adjacent of the side 111 of the support apparatus 100. In some embodiments, the first support portion 120a and/or second support portion 120b may each comprise (or form when the user is seated) a concave depression that is shaped, dimensioned and otherwise structured to support and cushion the corresponding adjacent gluteal muscles and buttock portions of the user, when the user is seated against/on the support apparatus 100. In some embodiments, the first support portion 120a and/or second support portion 120b may each comprise a planar surface that is shaped, dimensioned and otherwise structured to support and cushion the corresponding adjacent gluteal muscles and buttock portions of the user, when the user is seated against/on the support apparatus 100. In some embodiments, the first support portion 120a and/or second support portion 120b may each comprise (or form when the user is seated) a convex projection that is shaped, dimensioned and otherwise structured to support and cushion the corresponding adjacent gluteal muscles and buttock portions of the user, when the user is seated against/on the support apparatus 100.

In some embodiments, the first support portion 120a and/or second support portion 120b may comprise the concave depression even when not in use, or the first support portion 120a and/or second support portion 120b (e.g., comprising a planar surface or a convex protrusion) may be elastic/flexible and may form the concave depression when the user is seated thereon. That said, in some embodiments, the first support portion 120*a* and/or second support portion 120*b* may comprise a substantially flat or convex protruding surface.

Moreover, in some embodiments, the support body 110 of the support apparatus 100 comprises a second body portion 122 structured to relieve pressure of and to support a region proximate a coccyx of the user and/or otherwise receiving, accommodate and/or support the user's coccyx. As illustrated, the second body portion 122 may comprise a concave, elongate depression positioned between the first support portion 120*a* and second support portion 120*b* of the support member 120. In some embodiments, the depth of depression of the second body portion 22 is greater than that of the first support portion 120*a* and/or second support portion 120*b* (if any). That said, in some embodiments, the second body portion 122 may comprise a substantially flat or convex protruding surface.

Moreover, the body portion 110 comprises a first surface 111 and an opposite second surface 112. In some embodiments, the first surface 111 is a three-dimensional contoured surface, e.g., a curved or curvilinear surface. As such, the first surface 111 may comprise one or more of a complex curvilinear surface, at least a section of a paraboloid surface, at least a section of an ellipsoid surface, at least a section of a quadratic surface, a three-dimensional curved surface, a linear or planar surface, and/or a suitable combination of the foregoing, the combination of which forming the first support portion 120*a* and second support portion 120*b* of the support member 120, and the second body portion 122 therebetween. In other embodiments, the first surface 111 is a planar surface that is substantially flat. The first surface 111 typically comprises the first support portion 120*a* and second support portion 120*b* of the support member 120 which are shaped, dimensioned and otherwise structured to receive and at least partially surround the user's gluteal muscles, panniculus adiposus or buttocks of the user. The first surface 111 typically also comprises the second body portion 122 in between and extending from the first support portion 120*a* and second support portion 120*b*, which is shaped, dimensioned and otherwise structured to receive and at least partially surround the user's coccyx. The perimeter of the first surface 111 may be shaped like a rectangle, a polygon, an oval, an ellipse, a combination thereof, or any suitable curvilinear shape. In some embodiments, the perimeter of the first surface 111 comprises a combination of straight and curved surfaces (best illustrated by FIGS. 3A and 3B) with a complex elongate shape having depressions in the central portions of opposite sides 113 and 116 (e.g., at the second body portion 122) and/or projections at the opposite lateral ends 114 and 116.

As such, the first surface 111 may be dimensioned by a width function W and a length function L. In some embodiments, the value of the width function W of the support apparatus is defined as the distance between a first pair of opposing ends of the first surface 111 (e.g., perpendicular distance between opposing lateral surfaces 113 and 115 which terminate the first surface, as will be described below, measured on a plane perpendicular to both the lateral surfaces 113 and 115). In some embodiments, the value of the length function L of the support apparatus is defined as the distance between a second pair of opposing ends of the first surface 111 (e.g., perpendicular distance between opposing lateral surfaces 114 and 116 which terminate the first surface, as will be described below, measured on a plane perpendicular to both the lateral surfaces 114 and 116). In some embodiments, the width function W typically varies as a function of the length L, e.g., the value of the width function W may be substantially constant along the length of the support member 120 and may progressively decrease along the length of the second body portion 122, as best illustrated by FIGS. 3A and 3C. Moreover, in some embodiments, the length function L typically varies as a function of the width W, e.g., the value of the length function may be the highest at a central location and may progressively decrease towards the ends of the first surface 111. In some embodiments, the first surface 111 is symmetric about the second body portion 122. That said, in other embodiments, it is contemplated that first surface 111 may not be symmetric about the second body portion 122.

In some embodiments, the second surface 112, opposite the first surface 111, comprises a support element 130 (also referred to as an "elongate protrusion 130" or a "protrusion element 130") having a protrusion (e.g., of a substantially triangular cross section best illustrated by FIGS. 3B-3C and 4A-5B) structured to be accommodated/positioned in the void 34 or unsupported space 34 at transition region between the seating surface 36*a* and the back support surface 32*a* of the seating apparatus 30, as will be described in detail later on with respect to FIGS. 4A-5B.

Figure 4A:
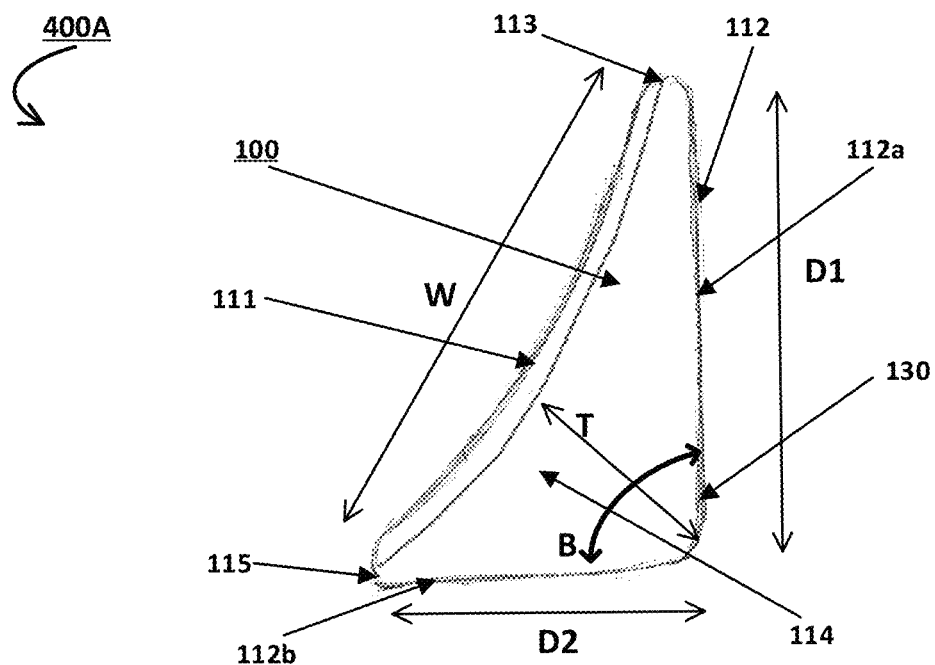
FIG. 4A illustrates a side cut-away view 400A of a support apparatus 100, in accordance with some embodiments of the invention.

Moreover, the body portion 110 of the support apparatus 100 comprises a first lateral side 113, a second lateral side 114, a third lateral side 115 and a fourth lateral side 116, each of which extends between and separates the first surface 111 and the second surface 112, by a thickness function T (best illustrated in FIGS. 3B-3C and 4A). The value of the thickness function T of the support apparatus is defined as the distance (e.g., perpendicular distance, distance along the altitude of the triangular cross-section, distance along the median of the triangular cross-section) between the first surface 111 and the second surface 112, measured on a plane perpendicular to both the first surface 111 and the second surface 112. Each of the first lateral side 113, second lateral side 114, third lateral side 115 and fourth lateral side 116 has an edge at the first surface 111 and an opposing edge at the second surface 112 each of which may be defined by a sharp corner, a bevel, a chamfer, a fillet or any other suitable contour between the surface (111, 112) and the respective first lateral side 113, second lateral side 114, third lateral side 115 and fourth lateral side 116.

In some embodiments, the thickness function T typically varies as a function of the width W (T(W)), e.g., the thickness function T is the greatest at a central portion of the support element 130 of the second surface 112, and decreasing/tapering towards the opposite sides 113 and 115, as best illustrated in FIGS. 3B and 4A. Moreover, in addition to the width, the thickness function T may also vary as a function of the length L, e.g., the value of the thickness function T may progressively decrease/taper towards opposite lateral sides 114 and 116. That said, in other embodiments, it is contemplated that the thickness of the support apparatus may be constant along the length and/or the width of the apparatus 110. The thickness function T, the length function L, and the width function W are typically structured to provide the first support portion 120*a* and second support portion 120*b* of the support member 120, the second body portion 122, and support element 130, which together are configured to (i) optimally support and stabilize the mid-region 24 of the user's body comprising the user's ischial tuberosity, gluteal region (via the support member 120) and/or the user's coccyx (via the second body portion 122), (ii) provide support in the void or transition region 34 between the seating portion and the back support portion of the seating apparatus when assembled in the seating apparatus (e.g., removably assembled) via the support element 130 (iii) without materially displacing the user (i.e., while still allowing the user's contact with the seating surface and the back support) and (iv) without impeding user movements and comfort.

The support apparatus 100 and/or portions of the support apparatus can be constructed using a variety of materials, including but not limited to, metals, alloys, composites, plastics, natural materials (e.g., wood), other synthetic materials, synthetic and natural fabrics, foams and other materials and/or natural/synthetic blends. The entirety of the support apparatus 100 may be manufactured from any of the materials listed herein (e.g., from a particular plastic material, from a particular composite alloy, from a particular foam material, etc.), or the support body may be constructed from a suitable combination of materials (e.g., a frame/flange(s) made from a particular metal or plastic or another substantially rigid material in combination with a support portion made out of a foam or a plastic or a flexible/elastic material).

In some embodiments, at least a portion of the support apparatus 100 and/or the support body 110 can be constructed using a variety of materials, including but not limited to, synthetic and natural fabrics, foams and other materials and natural/synthetic blends. At least a portion of the support apparatus may be made from allergy barrier materials comprising, but not limited to, tightly woven barriers, coated barriers to prevent mold spores, pollen, dust mites, and other contaminants from entering through the support body 110. The gauge measurement of the support body 110 (i.e., the number of needles per inch or per 1½ inches in a knitting machine) may be large enough to ensure a finer knit.

In some embodiments, at least a portion of the support apparatus comprises a filler material of the support body 110 which provides resiliency and support to the support apparatus 100. In other words, the filler material allows the support apparatus 100 to conform to the user's shape and is resilient enough to regain its original shape. The filler material can have a shape similar to or different from that of the support body 110 and can have similar or different dimensions. The filler material can be fabricated as a single part or multiple parts. In some embodiments the filler material comprises two or more parts. The filler material can be made from one or more materials, including in some embodiments a loose material such as fiber or poly beads, in one piece using plastic materials, in one or more pieces using plastics, metals, allows, composites, and/or other suitable materials. In some instances, the filler material can comprise polyfiber, reticulated foam, memory foam, hollow petrochemical beads, expanded polystyrene beads or any other natural or synthetic materials that collectively allow the filler material to have the resilient, conforming and supporting properties even after repeated/extended use.

In some embodiments the filler material and the filter barrier (optionally enclosing the filler material) are made of materials that have a high permeability and high wickability. As used herein, wickability means the ability of a fiber or a fabric to disperse moisture and allow it to pass through to the surface of the fabric, so that evaporation can take place. In some embodiments the filler material and the filter barrier comprise performance fabrics to provide functional qualities like moisture management, UV protection, antimicrobial, thermoregulation and wind and water resistance. In some embodiments the filter barrier comprises a mesh. As used herein, a mesh is a type of fabric characterized by its net-like open appearance, and the spaces between the yarns. In some embodiments the filler material and the filter barrier comprise a bacteriostat, fungal stat or antimicrobial material. As used herein, a bacteriostat means a material that kills the bacteria, slows growth or holding the death to growth rates of bacteria more or less in equilibrium, and/or inhibits bacteria growth. As used herein, a fungal stat means a material that kills the fungus, slows growth or holding the death to growth rates of fungus more or less in equilibrium, and/or inhibits fungus growth.

Moreover, in some embodiments the first support portion 120a and second support portion 120b of the support member 120, the second body portion 122, and support element 130 may each have different material properties (e.g., stiffness, compressibility, elasticity, resilience and the like) in comparison with each other, while in other embodiments two or more of the first support portion 120a and second support portion 120b, the second body portion 122, and support element 130 may comprise the same material properties.

Figure 4B:
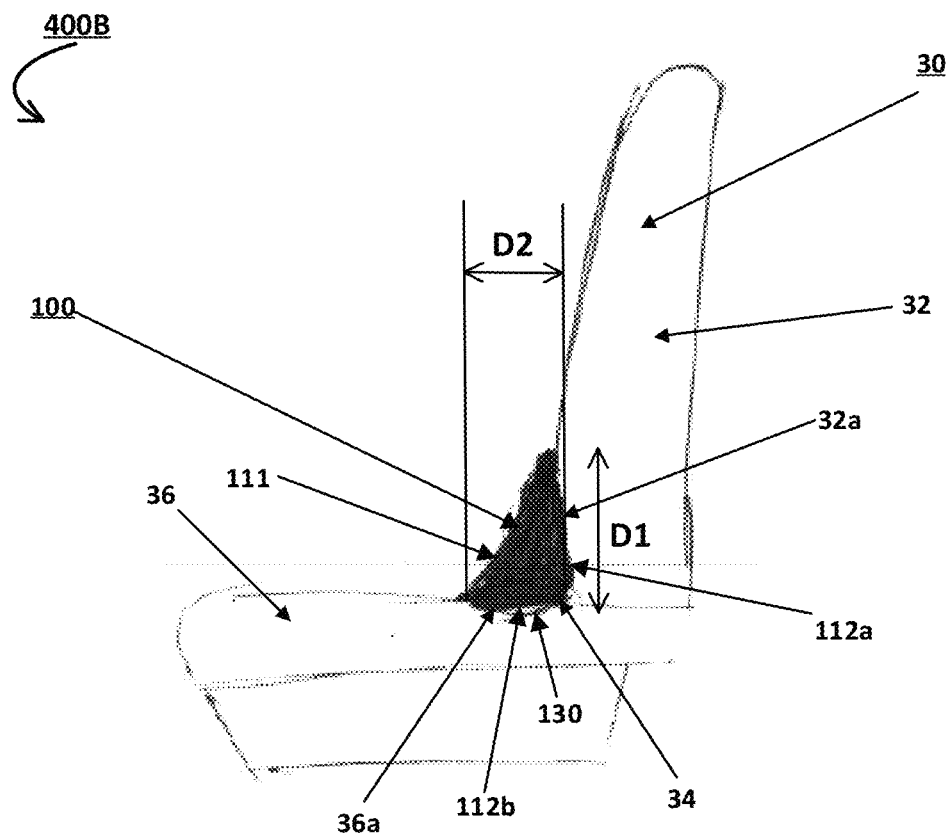
FIG. 4B illustrates a lateral view 400B of the support apparatus 100 assembled with a seating apparatus, in accordance with the embodiment of FIG. 4A.
Figure 5A:
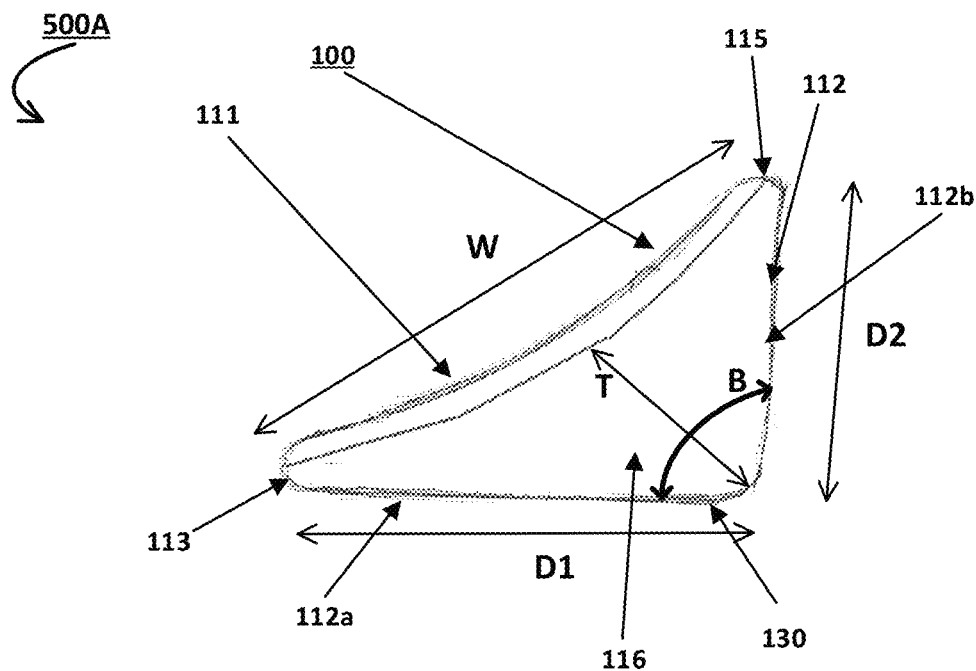
FIG. 5A illustrates a side cut-away view 500A of a support apparatus 100, in accordance with the embodiment of FIG. 4A.
Figure 5B:
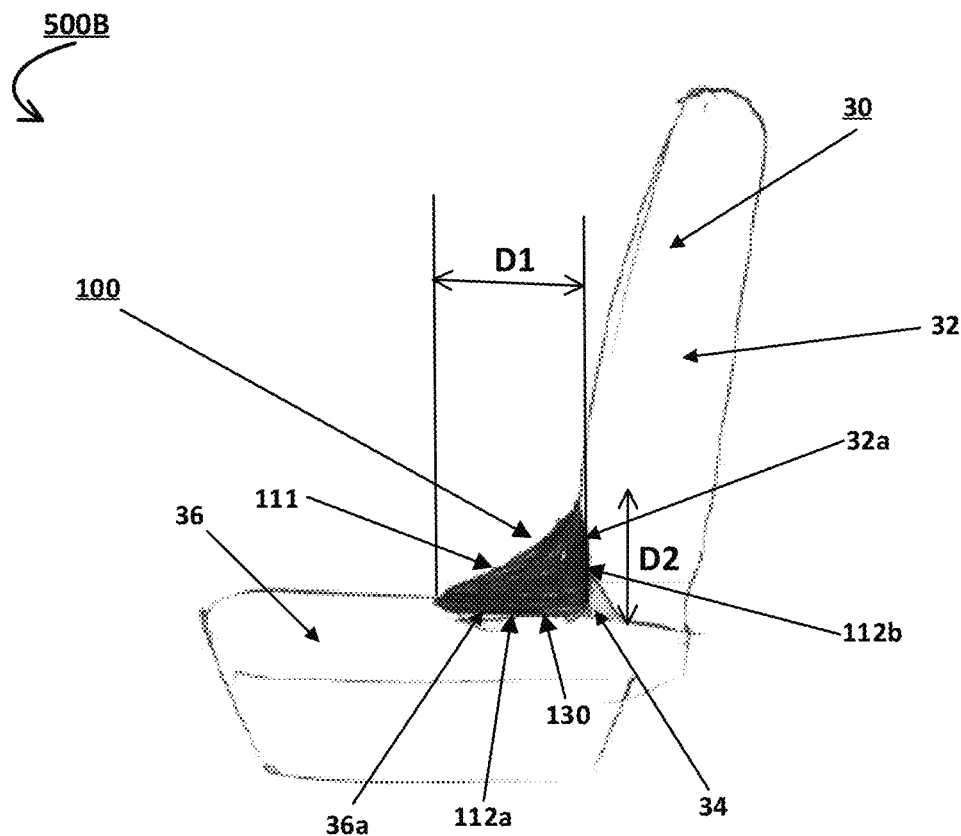
FIG. 5B illustrates a lateral view 500B of the support apparatus 100 assembled with a seating apparatus, in accordance with the embodiment of FIG. 5A.

FIGS. 4A-5B illustrate a side cut-away view of the support apparatus 100, in accordance with some embodiments of the invention. Specifically, FIG. 4A illustrates a side cut-away view 400A of the support apparatus 100, in accordance with some embodiments of the invention, e.g., when viewed from side 114. FIG. 4B illustrates a lateral view 400B of the support apparatus 100 assembled with the seating apparatus 30, in accordance with the embodiment of FIG. 4A. FIG. 5A illustrates a side cut-away view 500A of the support apparatus 100 when viewed from side 116, in accordance with the embodiment of FIG. 4A. FIG. 5B illustrates a lateral view 500B of the support apparatus 100 assembled with the seating apparatus 30, in accordance with the embodiment of FIG. 5A.

As discussed, in some embodiments, the second surface 112, opposite the first surface 111, comprises a support element 130 having a substantially triangular cross section (e.g., an acute angled triangle, an obtuse angled triangle, a right angled triangle, etc.) structured to be accommodated/positioned in the void 34 or unsupported space 34 at transition region between the seating surface 36a and the back support surface 32a of the seating apparatus 30 (best illustrated in FIGS. 4B and 5B). As best illustrated by FIGS. 4A and 5A, the substantially triangular cross section of the support apparatus 100, may comprise a first side formed by the first surface 111 of width function W, a second side formed by the portion 112a of the second surface 112 of length D1 and a third side formed by portion 112b of the second surface of length D2. This triangular cross section of the second surface 112 not only facilitates the positioning of the support apparatus 100 within the void or transition region 34 between the seating surface 36a and the back support surface 32a of the seating apparatus 30 (via the support element 130), the taper/gradual decrease of the thickness function T towards the sides 113 and 115 allows for seamless positioning of the support apparatus 100 within the void 34 without materially displacing the user, while still allowing the user's body to contact and be supported by the seating surface 36a and the back support surface 32a. That said, it is understood that the support apparatus 100 may comprise any suitable polygonal cross-section, curvilinear cross-section, or a combination thereof, with the first surface 111 forming one side and the remaining sides being formed by portion of the second surface 112.

The second side formed by the portion 112a of the second surface 112 of length D1 and the third side formed by portion 112b of the second surface of length D2 define an angle "B" therebetween. The angle B is structured to such that the support apparatus 100 may be positioned within the void or transition region 34 between the seating surface 36a and the back support surface 32a of the seating apparatus 30. In some instances, the angle B may be a substantially right angle, i.e., the second side 112a (length D1) and the third side 112b (length D2) may be substantially orthogonal. In some instances, the angle B may be an acute angle or an obtuse angle. As such the angle B may be about 90°, 75°, 85°, 100°, 105°, 110°, 115°, 70°, 65°, 85°-95°, 45°-95°, 45°-95°, 35°-95°, 75°-115°, 85°-120°, 85°-120°, 35°-120°, and/or in between, surrounding or overlapping these values/ranges. In some embodiments the angle B of the support apparatus 100 may be equal to or substantially equal to the angle A between the seating surface 36a and the back support surface 32a of the seating apparatus 30 (illustrated in FIG. 1). In some embodiments the angle B of the support apparatus 100 may comprise a value within a tolerance of + or −2°, 5°, 0.5°, 10°, 0.1°-5°, 0.1°-2°, 0.1°-5°, 0.1°-10°, of the angle A of the seating apparatus 30, e.g., such that flexure, elasticity, compressibility and/or expansion properties of the support apparatus 100 allow for its positioning in the void or transition region 34 of angle B between the seating surface 36a and the back support surface 32a of the seating apparatus 30.

As illustrated by FIG. 4B, the support apparatus 100 may be assembled or positioned in the seating apparatus 30 such that the second side 112a (length D1) at least partially or substantially contacts or is adjacent to the back support surface 32a, while the third side 112b (length D2) at least partially or substantially contacts or is adjacent to the seating surface 36a of the seating apparatus 30. In some embodiments, portions of the back support surface 32a above the support apparatus 100, the first surface 111 of the support apparatus 100 and portions of seating surface 36a beside the support apparatus 100, together, form a seamless or substantially seamless contour for the user's seating. The user 20 may then be seated in the seated apparatus 30 such that the mid-region 24 if the user's body is supported by the support apparatus 100.

In some embodiments, the support apparatus is adjustable to suit the user's requirements. In this regard, as illustrated by FIGS. 5A and 5B, the support apparatus 100 may be reversed (or flipped) to better accommodate the user. Here, the support apparatus 100 may be assembled or positioned in the seating apparatus 30 such that the third side 112b (length D2) at least partially or substantially contacts or is adjacent to the back support surface 32a, while the second side 112a (length D1) at least partially or substantially contacts or is adjacent to the seating surface 36a of the seating apparatus 30.

In some embodiments, the support apparatus may be removably affixed to a seat cover (not illustrated) of the seating apparatus 30, particularly in the instance where the setting apparatus comprises an automobile seat.

Figure 6A:
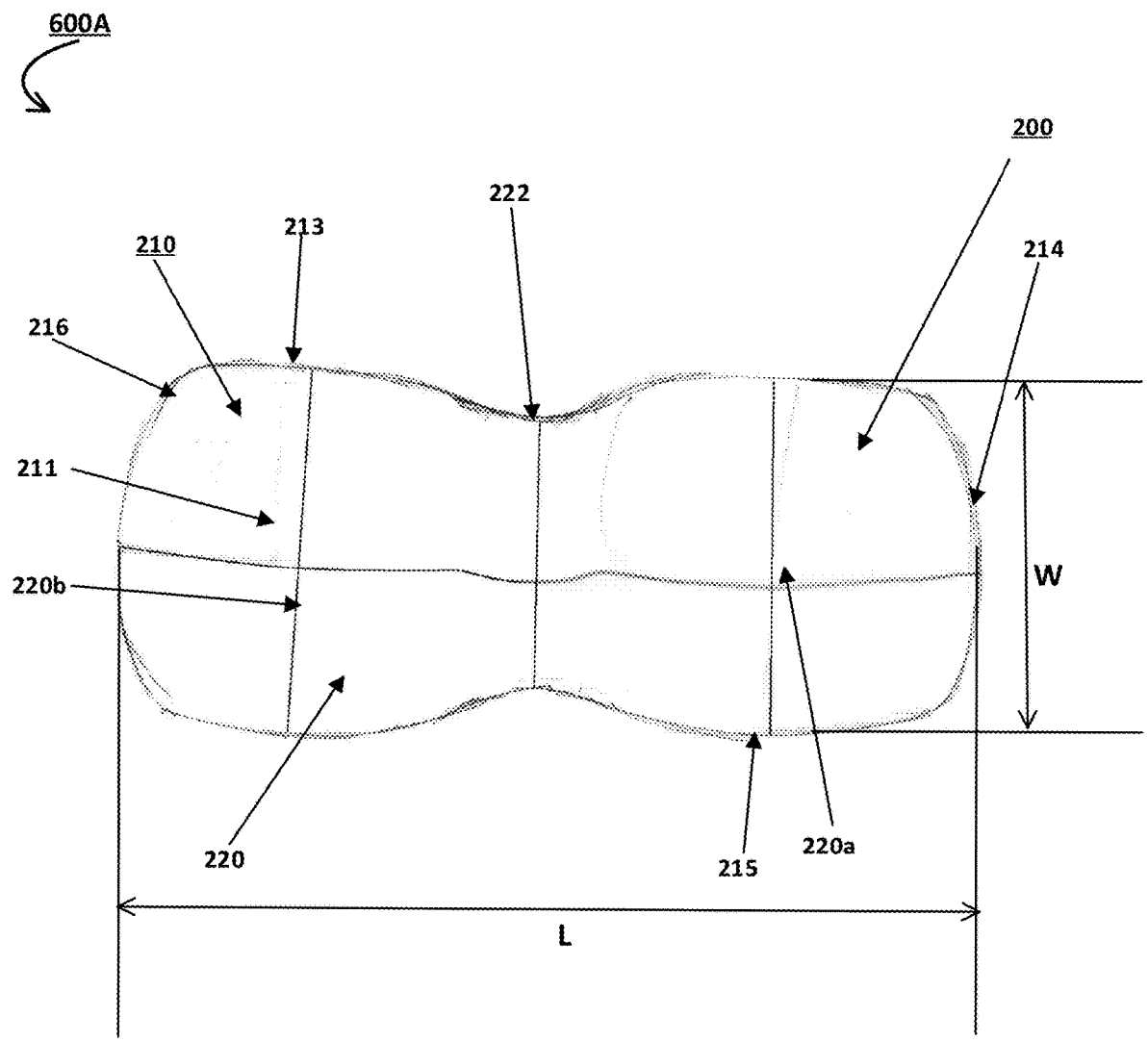
FIG. 6A illustrates a front view 600A of a support apparatus 200, in accordance with some embodiments of the invention.
Figure 6B:
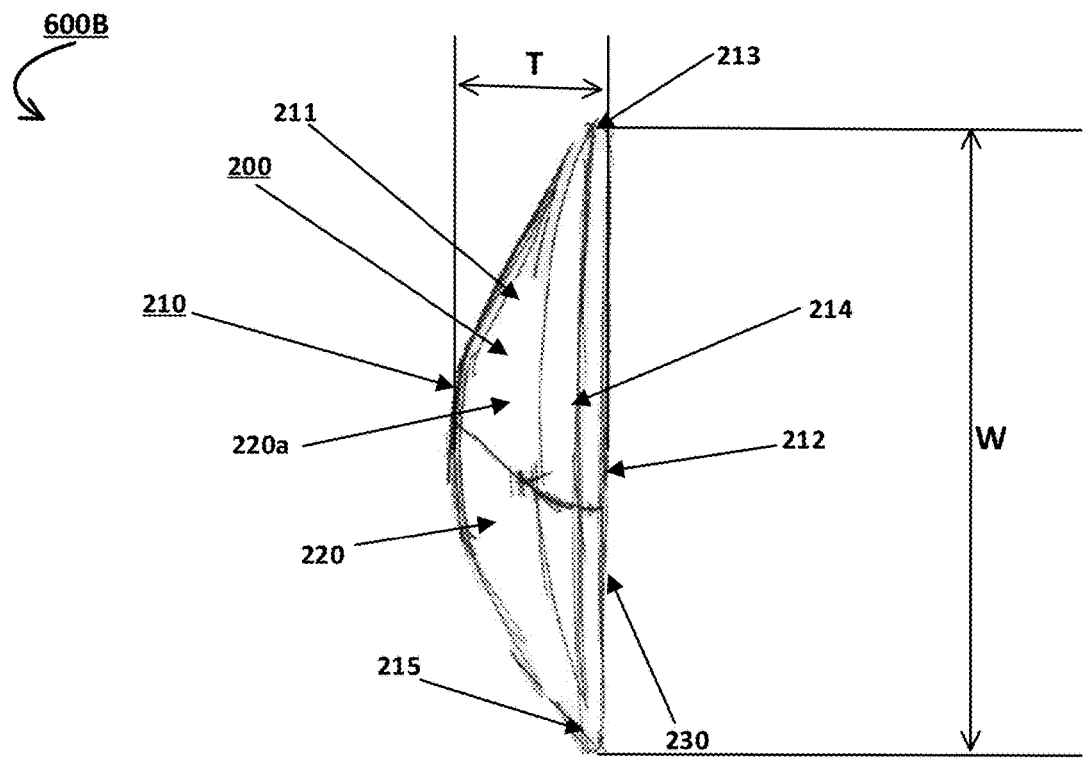
FIG. 6B illustrates a lateral view 600B of the support apparatus 200, in accordance with the embodiment of FIG. 6A.
Figure 6C:
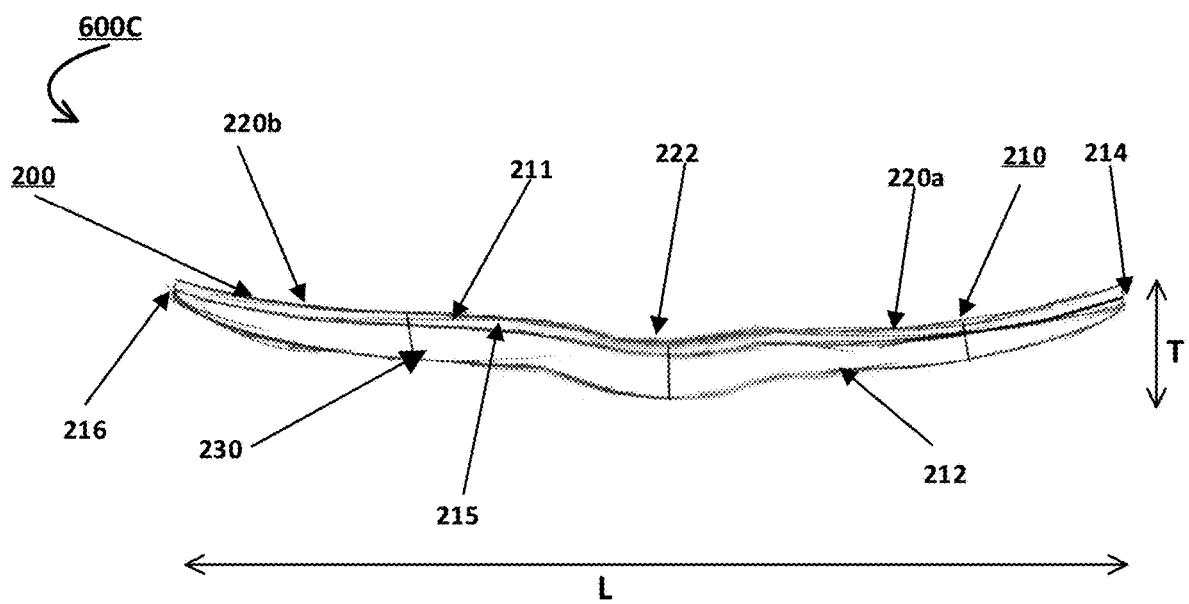
FIG. 6C illustrates a side view 600C of the support apparatus 200, in accordance with the embodiment of FIG. 6A.

FIGS. 6A-6C illustrate a support apparatus 200, in accordance with some embodiments of the invention. The features and functions of the support apparatus 200 are substantially similar to that of the support apparatus 100 described previously with respect to FIGS. 3A-5B. FIG. 6A illustrates a front view 600A of a support apparatus 200, in accordance with some embodiments of the invention. Although, termed as "front" it is understood that "front side" herein means the support apparatus 200 being viewed from the side 211 and not any particular orientation of the support apparatus 200 during use or otherwise. FIG. 6B illustrates a lateral view 600B (right-side view, i.e., when viewed from side 214) of the support apparatus 200, in accordance with the embodiment of FIG. 6A. FIG. 6C illustrates a side view 600C (bottom side view, i.e., when viewed from side 215) of the support apparatus 200, in accordance with the embodiment of FIG. 6A. Like numbers refer to like elements throughout.

Similar to the support apparatus 100, the support apparatus 200 includes a support body 210, as illustrated by FIGS. 6A-6C. The support body 210 of the support apparatus 200 comprises a support member 220 (also referred to as a "first body portion 220") configured for receiving, supporting and/or accommodating the user's gluteal muscles, panniculus adiposus or buttocks of the user. The support member 220 comprises a first support portion 220a configured to support the corresponding/adjacent portion of the user's gluteal muscles when the user is seated against/on the support apparatus 200, i.e., the first support portion 220a configured to support at least a portion of the left gluteus maximus muscle, left gluteus medius muscle and/or left gluteus minimus muscle when the user is seated against the support apparatus 200 with the user's posterior facing and adjacent of the side 211 of the support apparatus 200. The support member 220 further comprises a second support portion 220b configured to support the corresponding/adjacent portion of the user's gluteal muscles when the user is seated against the support apparatus 200, i.e., the second support portion 220b configured to support at least a portion of the right gluteus maximus muscle, right gluteus medius muscle and/or right gluteus minimus muscle when the user is seated against the support apparatus 200 with the user's posterior facing and adjacent of the side 211 of the support apparatus 200. In some embodiments, the first support portion 220a and/or second support portion 220b may each comprise (or form when the user is seated) a concave depression that is shaped, dimensioned and otherwise structured to support and cushion the corresponding adjacent gluteal muscles and buttock portions of the user, when the user is seated against/on the support apparatus 200. In some embodiments, the first support portion 220a and/or second support portion 220b may each comprise a planar surface that is shaped, dimensioned and otherwise structured to support and cushion the corresponding adjacent gluteal muscles and buttock portions of the user, when the user is seated against/on the support apparatus 200. In some embodiments, the first support portion 220a and/or second support portion 220b may each comprise (or form when the user is seated) a convex projection that is shaped, dimensioned and otherwise structured to support and cushion the corresponding adjacent gluteal muscles and buttock portions of the user, when the user is seated against/on the support apparatus 200.

Similar to the support apparatus 100, in some embodiments, the first support portion 220a and/or second support portion 220b may comprise the concave depression even when not in use, or the first support portion 220a and/or second support portion 220b (e.g., comprising a planar surface or a convex protrusion) may be elastic/flexible and may form the concave depression when the user is seated thereon. That said, in some embodiments, the first support portion 220a and/or second support portion 220b may comprise a substantially flat or convex protruding surface.

Similar to the support apparatus 100, in some embodiments, the support body 210 of the support apparatus 200 comprises a second body portion 222 structured to relieve pressure of and to support a region proximate a coccyx of the user and/or otherwise receiving, accommodate and/or support the user's coccyx. As illustrated, the second body portion 222 may comprise a concave, elongate depression positioned between the first support portion 220a and second support portion 220b of the support member 220. In some embodiments, the depth of depression of the second body portion 222 is greater than that of the first support portion 220a and/or second support portion 220b (if any). That said, in some embodiments, the second body portion 222 may comprise a substantially flat or convex protruding surface.

Moreover, the body portion 210 comprises a first surface 211, an opposite second surface 212, a pair of opposing lateral sides 213 and 215, and a pair of opposing lateral sides 214 and 216, similar to the body portion 110 of the support apparatus 100. As such, the first surface 211 may be dimensioned by a width function W and a length function L. In some embodiments, the value of the width function W of the support apparatus is defined as the distance between a first pair of opposing ends of the first surface 211 (e.g., perpendicular distance between opposing lateral surfaces 213 and 215 which terminate the first surface, as will be described below, measured on a plane perpendicular to both the lateral surfaces 213 and 215). In some embodiments, the value of the length function L of the support apparatus is defined as the distance between a second pair of opposing ends of the first surface 211 (e.g., perpendicular distance between opposing lateral surfaces 214 and 216 which terminate the first surface, as will be described below, measured on a plane perpendicular to both the lateral surfaces 214 and 216). In some embodiments, the width function W typically varies as a function of the length L, e.g., the value of the width function W may be substantially constant along the length of the support member 220 and may progressively decrease along the length of the second body portion 222, as best illustrated by FIGS. 6A and 6C. Moreover, in some embodiments, the length function L typically varies as a function of the width W, e.g., the value of the length function may be the highest at a central location and may progressively decrease towards the ends of the first surface 211. In some embodiments, the first surface 211 is symmetric about the second body portion 222. That said, in other embodiments, it is contemplated that first surface 211 may not be symmetric about the second body portion 222.

In some embodiments, the second surface 212, opposite the first surface 211, comprises a support element 230 (also referred to as an "elongate protrusion 230" or a "protrusion element 230"), similar to the support element 130 of support apparatus 100, structured to be accommodated/positioned in the void 34 or unsupported space 34 at transition region between the seating surface 36a and the back support surface 32a of the seating apparatus 30, as will be described in detail later on with respect to FIG. 7.

Moreover, the first surface 211 and the second surface 212 may be by a thickness function T (best illustrated in FIGS. 6B-6C). The value of the thickness function T of the support apparatus is defined as the distance (e.g., perpendicular distance, distance along the altitude of the triangular cross-section, distance along the median of the triangular cross-section) between the first surface 211 and the second surface 212, measured on a plane perpendicular to both the first surface 211 and the second surface 212. Each of the first lateral side 213, second lateral side 214, third lateral side 215 and fourth lateral side 216 has an edge at the first surface 211 and an opposing edge at the second surface 212 each of which may be defined by a sharp corner, a bevel, a chamfer, a fillet or any other suitable contour between the surface (211, 212) and the respective first lateral side 213, second lateral side 214, third lateral side 215 and fourth lateral side 216. The thickness function T may vary as a function of the width W (T(W)), vary as a function of the length L and/or remain constant. The support apparatus 200 and/or portions of the support apparatus can be constructed suitable materials, as described previously with response to support apparatus 100.

Figure 7:
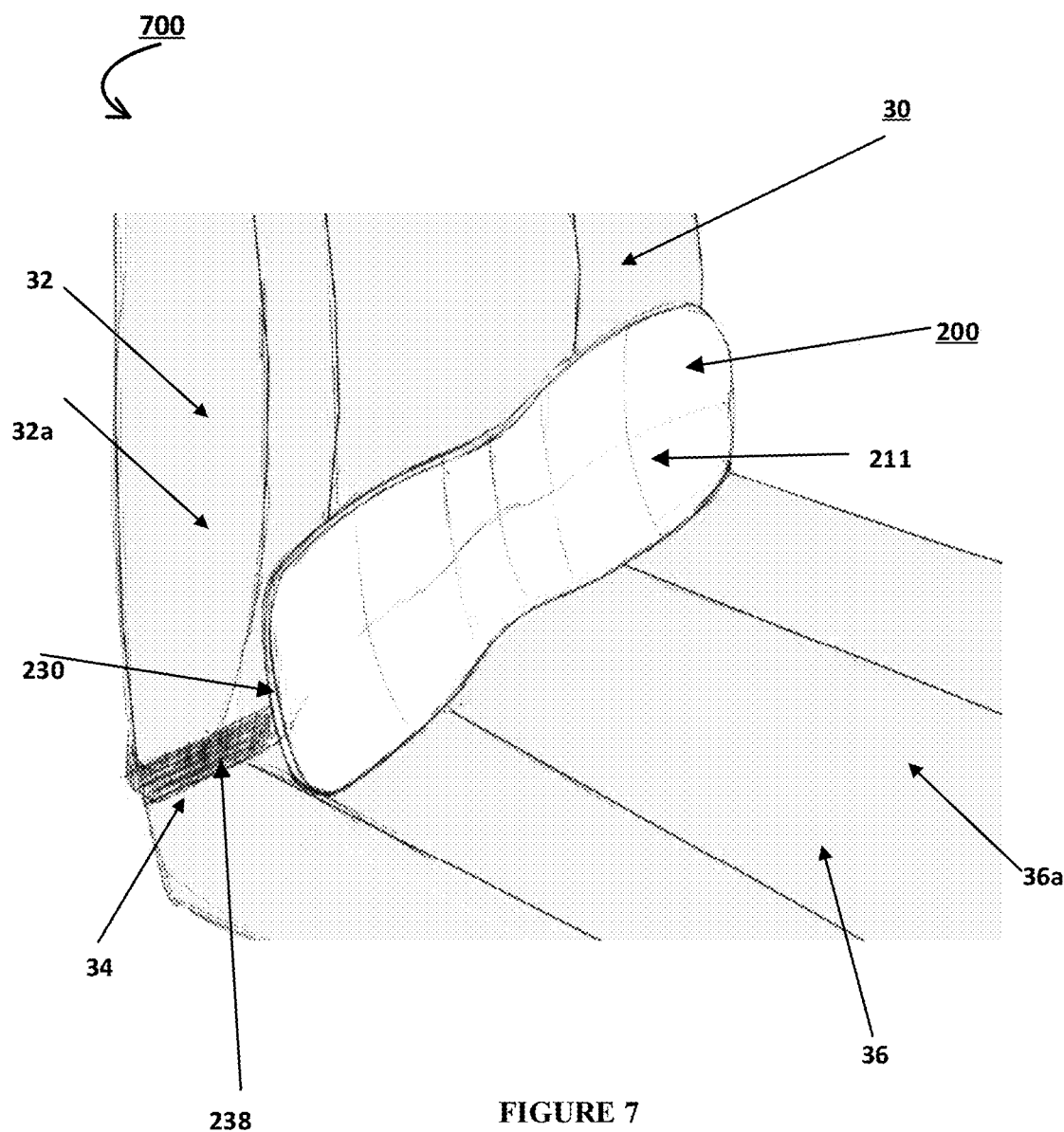
FIG. 7 illustrates a perspective view 700 of the support apparatus 200 assembled with a seating apparatus.

FIG. 7 illustrates a perspective view 700 of the support apparatus 200 assembled with the seating apparatus 30. As illustrated by FIG. 7, the support apparatus 200 may be assembled or positioned in the seating apparatus 30. As illustrated, in some embodiments, the support apparatus 200 comprises an assembly element 238 that is attached to the support element 230 and/or the support member 220. In some embodiments, the assembly element 238 is a part of the support element 230. The assembly element 238 facilitates the positioning and securing of the support apparatus 200 within the void or transition region 34 between the seating surface 36a and the back support surface 32a of the seating apparatus 30, without materially displacing the user, while still allowing the user's body to contact and be supported by the seating surface 36a and the back support surface 32a. As illustrated by FIG. 7, the assembly element 238 may comprise an elongate band (e.g., a flexible/elastic band). That said, the assembly element 238 may comprise any suitable configuration such as clips, buttons, flanges, frames, etc. for positioning and securing of the support apparatus 200 within the void or transition region 34 between the seating surface 36a and the back support surface 32a of the seating apparatus 30.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein.

What is claimed is:

1. A support apparatus for supporting at least a portion of a gluteal region of a user while the user is seated in a seating apparatus comprising a seating surface, a back support surface and a transition region at the intersection of the seating surface and the back support surface, comprising:

a support member comprised of one or more filler materials comprising a first side and a second side, wherein the first side is structured to support at least a portion of the gluteal region of the user, wherein the support member defines first and second lateral sides defining a width therebetween and third and fourth lateral sides defining a length therebetween, wherein the length is greater than the width, wherein the support member further comprises a first support portion positioned on the first surface of the support member structured to support at least a portion of the gluteal region of the user, a second support portion positioned on the first surface of the support member structured to support at least a portion of the gluteal region of the user, and a concave depression structured to relieve pressure of and to support a region proximate a coccyx of the user, wherein the concave depression is positioned in between the first support portion and the second support portion on the first side of the support member and wherein the thickness of the support member between the first side and second side within the concave depression is less than the thickness of the support member between the first side and second side (i) through the first support portion and (ii) through the second support portion; and a support element extending from the second side of the support member to a terminal end and structured to position the support member at the transition region of the seating apparatus such that the support member extends between the seating surface and the back support surface of the seating apparatus when the terminal end of the support member is positioned in the transition region of the seating apparatus, the support element defining a length and defining a midpoint at location equal to one half the length of the support element, the support element comprising a substantially triangular cross section defined by the terminal end, a first side extending from the second side of the support member to the terminal end, and a second side extending from the second side of the support member to the terminal end, and wherein, at the terminal end, the first side of the support element and the second side of the support element define an angle between 35 degrees and 120 degrees, and wherein the support element extends along the length of the second side of the support member and wherein, between the second side of the support member and the terminal end, the support element defines a solid structure filler material, the support element having a thickness and wherein the thickness of the support element at the midpoint is greater than the thickness of the support element at both the third lateral side of the support member and the fourth lateral side of the support member.

2. The support apparatus of claim 1, wherein the concave depression is positioned within a central portion of the first surface of the support member.

3. The support apparatus of claim 1, wherein the first side of the support element is structured to contact the back support surface and the second side of the support element is structured to contact the seating surface of the seating apparatus when the support apparatus is positioned within the transition region of the seating apparatus.

4. The support apparatus of claim 3, wherein the first side of the support element and the second side of the support element are substantially orthogonal.

5. The support apparatus of claim 3, wherein the support member defines an axis extending between the third and fourth lateral sides and through the concave depression and wherein the support apparatus is symmetrical about the axis.

6. The support apparatus of claim 1, wherein the first side of the support member defines a plurality of apertures.

7. The support apparatus of claim 1, wherein the first support portion and second support portion each comprise a convex projection structured to support at least a portion of the gluteal region of the user.

8. The support apparatus of claim 1, wherein the support apparatus is structured to be assembled with the seating apparatus such that the user may be seated in the seating apparatus without material displacement of the user.

9. A method of using a support apparatus to support at least a portion of a gluteal region of a user while the user is seated in a seating apparatus comprising a seating surface, a back support surface and a transition region at the intersection of the seating surface and the back support surface, comprising:

providing a support apparatus comprising:

a support member comprised of one or more filler materials comprising a first side and a second side, wherein the first side is structured to support at least a portion of the gluteal region of the user, wherein the support member defines first and second lateral sides defining a width therebetween and third and fourth lateral sides defining a length therebetween, wherein the length is greater than the width, wherein the support member further comprises a first support portion positioned on the first surface of the support member structured to support at least a portion of the gluteal region of the user, a second support portion positioned on the first surface of the support member structured to support at least a portion of the gluteal region of the user, and a concave depression structured to relieve pressure of and to support a region proximate a coccyx of the user, wherein the concave depression is positioned in between the first support portion and the second support portion on the first side of the support member and wherein the thickness of the support member between the first and second side within the concave depression is less than the thickness of the support member between the first side and second side (i) through the first support portion and (ii) through the second support portion; and a support element extending from the second side of the support member to a terminal end and structured to position the support member at the transition region of the seating apparatus such that the support member extends between the seating surface and the back support surface of the seating apparatus when the terminal end of the support member is positioned in the transition region of the seating apparatus, the support element defining a length and defining a midpoint at location equal to one half the length of the support element, the support element comprising a substantially triangular cross section defined by the terminal end, a first side extending from the second side of the support member to the terminal end, and a second side extending from the second side of the support member to the terminal end, and wherein, at the terminal end, the first side of the support element and the second side of the support element define an angle between 35 degrees and 120 degrees, and wherein the support element extends along the length of the second side of the support member and wherein, between the second side of the support member and the terminal end, the support element defines a solid structure filler material, the support element having a thickness and wherein the thickness of the support element at the midpoint is greater than the thickness of the support element at both the third lateral side of the support member and the fourth lateral side of the support member; and positioning the support element of the support apparatus in the transition region between the seating surface and back support surface of the seating apparatus such that the support member extends between the seating surface and the back support surface of the seating apparatus.

10. The method of claim 9, wherein the first side of the support member defines a plurality of apertures.

11. The method of claim 9, wherein the support apparatus further comprises an outer cover structured to at least partially enclose the support member and support element.

12. The method of claim 9, wherein the support member comprises memory foam.

13. The method of claim 9, wherein the support element comprises memory foam.

14. The support apparatus of claim 1, further comprising:
an outer cover structured to at least partially enclose the support member and support element.

15. The support apparatus of claim 1, wherein the thickness of the support element is greatest at the midpoint and tapers from the midpoint along the length of the support element toward the third lateral side of the support member and tapers from the midpoint along the length of the support element toward the fourth lateral side of the support member.

16. The support apparatus of claim 1, wherein the support member comprises memory foam.

17. The support apparatus of claim 1, wherein the support element comprises memory foam.

18. The support apparatus of claim 1, wherein the support member and the support element comprise different materials.

* * * * *